US008459713B2

(12) United States Patent
Sella et al.

(10) Patent No.: US 8,459,713 B2
(45) Date of Patent: Jun. 11, 2013

(54) ASSEMBLY FOR ATTACHING AN EMBLEM ONTO AN AIRBAG STORAGE COMPARTMENT COVER

(75) Inventors: Terry Sella, Reese, MI (US); Michael Kutchey, Ortonville, MI (US); James N. Sonnenberg, Sterling Heights, MI (US)

(73) Assignee: Autoliv ASP, Inc., Ogden, UT (US)

( * ) Notice: Subject to any disclaimer, the term of this patent is extended or adjusted under 35 U.S.C. 154(b) by 256 days.

(21) Appl. No.: 12/853,137

(22) Filed: Aug. 9, 2010

(65) Prior Publication Data
US 2012/0030980 A1 Feb. 9, 2012

(51) Int. Cl.
*B60R 21/215* (2011.01)
(52) U.S. Cl.
USPC ........................................ 296/1.08; 280/728.3
(58) Field of Classification Search
USPC .... 296/70, 39.1, 191, 37.12, 1.08; 280/728.3, 280/731, 732; 40/591, 911
See application file for complete search history.

(56) References Cited

U.S. PATENT DOCUMENTS

| | | | | |
|---|---|---|---|---|
| 5,678,851 A | * | 10/1997 | Saito et al. | 280/728.3 |
| 5,685,056 A | * | 11/1997 | Fischer | 29/512 |
| 5,762,365 A | * | 6/1998 | Worrell et al. | 280/731 |
| 5,775,721 A | * | 7/1998 | Grout | 280/727 |
| 5,811,506 A | | 9/1998 | Slagel | |
| 5,851,022 A | * | 12/1998 | Yamamoto et al. | 280/728.3 |
| 5,947,511 A | | 9/1999 | Usui et al. | |
| 6,003,895 A | | 12/1999 | Niwa et al. | |
| 6,032,978 A | | 3/2000 | Spencer et al. | |
| 6,053,526 A | * | 4/2000 | Preisler et al. | 280/728.2 |
| 6,105,999 A | | 8/2000 | Johnson | |
| 6,135,489 A | * | 10/2000 | Bowers | 280/728.3 |
| 6,170,871 B1 | | 1/2001 | Goestenkors et al. | |

(Continued)

FOREIGN PATENT DOCUMENTS

| | | |
|---|---|---|
| EP | 0 835 788 A1 | 4/1998 |
| GB | 2 262 488 A1 | 6/1993 |
| JP | 11-198251 | 7/1999 |
| JP | 2000-118344 | 4/2000 |

*Primary Examiner* — Glenn Dayoan
*Assistant Examiner* — Gregory Blankenship
(74) *Attorney, Agent, or Firm* — Madson IP, P.C.

(57) ABSTRACT

An assembly for attaching an emblem onto the front face of an airbag storage enclosure cover has a plurality of attachment posts that project from the back surface of the emblem and extend through the cover from the front face to terminate in free ends remote from the emblem. An attachment backing sheet is positioned against the rear face of the cover, whereby the attachment posts also extend through the attachment backing sheet with the free end of each positioned on the side of the attachment backing sheet opposite from the cover. A plurality of radially-enlarged attachment nuggets are formed or joined individually in a one-to-one association to the free end of the attachment posts, and each of the attachment nuggets is secured to the backing sheet in proximity to the associated attachment post. The attachment backing sheet thus tethers each of the attachment nuggets to the cover in the event of the mechanical failure of an associated attachment post. The attachment nuggets may be integrally formed with or bonded to the free ends of the attachment posts. If the attachment backing sheet is made of a porous material, such as a fabric, a mesh, or a screen, the material of the attachment nuggets permeates pores in the material of the attachment backing sheet in proximity to each associated attachment post. If the attachment backing sheet is made of a plastic material, the attachment nuggets are bonded with adhesive to the attachment backing sheet.

15 Claims, 6 Drawing Sheets

U.S. PATENT DOCUMENTS

| | | | |
|---|---|---|---|
| 6,209,905 B1* | 4/2001 | Preisler et al. | 280/728.2 |
| 6,213,497 B1 | 4/2001 | Spencer et al. | |
| 6,280,823 B1 | 8/2001 | Preisler et al. | |
| 6,443,484 B2 | 9/2002 | Anglsperger | |
| 6,517,103 B1 | 2/2003 | Schneider | |
| 6,568,704 B2 | 5/2003 | Iida et al. | |
| 6,581,311 B1* | 6/2003 | Davey et al. | 40/593 |
| 6,613,415 B2* | 9/2003 | Iida et al. | 428/139 |
| 6,620,371 B1 | 9/2003 | Winget et al. | |
| 6,760,989 B2* | 7/2004 | Peterson et al. | 40/593 |
| 7,097,199 B2* | 8/2006 | Dearden et al. | 280/728.3 |
| 7,213,833 B2 | 5/2007 | Amamori | |
| 7,591,480 B2* | 9/2009 | Kreuzer | 280/728.3 |
| 7,654,557 B2 | 2/2010 | Enders | |
| 7,766,371 B2* | 8/2010 | Fujimori et al. | 280/728.3 |
| 7,775,550 B2* | 8/2010 | Dominguez Aparicio et al. | 280/728.3 |
| 8,210,565 B2* | 7/2012 | Hayashi | 280/728.3 |
| 8,246,075 B2* | 8/2012 | Gaumann et al. | 280/728.3 |
| 8,250,725 B2* | 8/2012 | Sigler et al. | 29/447 |
| 2001/0052690 A1* | 12/2001 | Nishiura et al. | 280/728.3 |
| 2002/0000712 A1* | 1/2002 | Derrick et al. | 280/728.3 |
| 2003/0209889 A1 | 11/2003 | Erwin et al. | |
| 2005/0236427 A1 | 10/2005 | Farha et al. | |
| 2006/0108775 A1 | 5/2006 | Schirholz et al. | |
| 2007/0035111 A1 | 2/2007 | Oh | |
| 2008/0079241 A1* | 4/2008 | Fujimori et al. | 280/727 |
| 2008/0292426 A1 | 11/2008 | Snow et al. | |
| 2009/0121459 A1 | 5/2009 | Bostick et al. | |

* cited by examiner

ASSEMBLY FOR ATTACHING AN EMBLEM ONTO AN AIRBAG STORAGE COMPARTMENT COVER

BACKGROUND OF THE INVENTION

1. Field of the Invention

The present invention pertains to the safety of riders in highway vehicles that use airbags to protect the riders from impact with the interiors of the occupant enclosures of the vehicles. More particularly, the present invention relates to structures associated with the cover for the compartment in which an airbag is stored prior to the deployment of the airbag into the occupant enclosure.

2. Background

Inflatable safety restraint airbags are now legally mandated in most new highway vehicles. Airbags are typically included at least in the steering wheel and in the dashboard on the passenger side of highway vehicles. Additional airbags are installed to inflate beside a vehicle occupant and provide side impact protection, to inflate in front of the legs and protect the knees from forward impact, and to inflate at other strategic locations within the occupant enclosure.

Each airbag is stowed in a deflated condition pending the development of circumstances in which the airbag needs to be deployed. For airbags in the steering wheel or in the dashboard, the deflated airbag resides in an airbag storage compartment that communicates with the occupant enclosure. A cover interposed between the airbag storage compartment and the occupant enclosure deters tampering and serves as a visually attractive interior façade.

In the event of an accident, a sensor system within the vehicle detects an impact situation and triggers the ignition of an inflator. Inflation gas from the inflator immediately enters the airbag. As the airbag inflates, the airbag forces the cover of the airbag compartment aside, and the airbag enters the occupant enclosure, deploying as a protective cushion between riders and interior surfaces of the occupant enclosure.

It has become the practice of some vehicle manufacturers to include a decorative emblem, such as a company logo, on the face of the pliable cover for an airbag storage compartment that is directed toward the occupant enclosure. The emblem may be printed on the cover, embossed into the material of the cover, or assembled onto the cover using hard plastic elements or other suitable materials that are distinct from the cover.

When an emblem is assembled onto the cover of an airbag storage compartment, corresponding additional passenger safety concerns are created. Vehicle safety standards require that the emblem, as well as any components by which the emblem is secured to the cover, be reliably prevented from being detached from the cover during airbag deployment. The rapidity of airbag inflation imposes substantial forces on the cover of an airbag storage compartment. Under the influence of these forces, during airbag deployment components assembled onto the cover can break apart and become potentially injurious projectiles within the passenger enclosure.

BRIEF SUMMARY OF THE INVENTION

According to one aspect of the present invention, an assembly for attaching an emblem onto the front face of the cover for an airbag storage enclosure includes a plurality of attachment posts projecting from the back surface of the emblem and extending through the cover from the front face thereof to terminate in a respective free end thereof remote from the emblem. An attachment backing sheet is positioned against the rear face of the cover, whereby each of the attachment posts also extends through the attachment backing sheet with the respective free end of each attachment post positioned on the side of the attachment backing sheet opposite from the cover. A plurality of radially-enlarged attachment nuggets are joined individually in a one-to-one association to the free end of each of the plurality of attachment posts, but in addition, each of the plurality of attachment nuggets is secured to the backing sheet in proximity to the attachment post thereby associated therewith.

The attachment nuggets are integrally formed with the free end of the attachment posts or are bonded to the free end of the attachment posts. If the attachment backing sheet is made of a porous material, such as for example a fabric, a mesh, or a screen, the material of each of the plurality of attachment nuggets permeates pores in the material of the attachment backing sheet in proximity to the attachment post associated therewith. If the attachment backing sheet is made of a plastic material, the plurality of attachment nuggets are bonded with adhesive, for example, to the attachment backing sheet. The attachment backing sheet thus functions as a means for tethering each of the plurality of attachment nuggets to the cover in the event of the mechanical failure of an associated attachment post.

In another aspect of the present invention, a system for attaching an emblem onto the front face of the cover for an airbag storage enclosure includes an attachment backing sheet positioned against the rear face of the cover and a plurality of attachment posts that project from the back surface of the emblem. Each of the attachment posts is extendable through the cover from the front face thereof and through the attachment backing sheet to terminate in a respective free end that is positioned on the side of the attachment backing sheet opposite from the cover. The free end of each of the plurality of attachment posts is made of a thermoplastic material that is deformable into a respective radially-enlarged attachment nugget. In the process of such a deformation, each of the attachment nuggets also becomes secured to the attachment backing sheet in proximity to the attachment post associated therewith. This result accrues, because the attachment backing sheet is made of a porous material, and the material of each of the plurality of attachment nuggets, being a thermoplastic material, is capable of permeating pores in the material of the attachment backing sheet in proximity to the attachment post associated therewith.

In yet another aspect of the present invention, a method for attaching an emblem onto the front face of the cover for an airbag storage enclosure involves disposing an attachment backing sheet against the rear face of the cover, causing a plurality of attachment posts to project from the back surface of the emblem and terminate in free ends remote from the emblem, advancing the free ends of the plurality of attachment posts through the cover from the front face thereof, piercing the free ends of the plurality of attachment posts through the attachment backing sheet, joining a plurality of radially-enlarged attachment nuggets individually in a one-to-one association to the free ends of each of the plurality of attachment posts, and securing each of the plurality of attachment nuggets to the attachment backing sheet in the vicinity of the respective attachment post associated therewith.

In the above-described method, the step of advancing includes the steps of forming a plurality of apertures through the cover corresponding in number and pattern to the number and the pattern of the plurality of attachment posts on the back surface of the emblem, entering the free ends of the plurality of attachment posts from the front face of the cover individually in one-to-one association into the plurality of apertures through the cover, and bringing the back surface of the emblem into contact with the front face of the cover. The step of piercing includes the steps of forming a plurality of slits through the attachment backing sheet corresponding in number and pattern to the number and the pattern of the plurality of attachment posts on the back surface of the emblem, entering the free ends of the plurality of attachment posts from the side of the attachment backing sheet facing the cover individually in one-to-one association with the plurality of the slits through the attachment backing sheet, and sandwiching the cover between the attachment backing sheet and the back surface of the emblem.

Furthermore in various embodiments of that method, the step of joining and the step of securing may be performed simultaneously. The step of joining may involve bonding the plurality of attachment nuggets individually in a one-to-one relationship to the free ends of the plurality of corresponding attachment posts, or the step of joining may involve deforming the material of the free end of each of the plurality of attachment posts radially outwardly of each of the plurality of attachment posts by softening the material of the free end of each of the plurality of attachment posts using a treatment selected from the group of treatments comprising ultrasonic heating, conduction heating, and convection heating. Then the step of securing involves urging the softened material of each of the plurality of attachment nuggets into pores in the attachment backing sheet.

BRIEF DESCRIPTION OF THE SEVERAL VIEWS OF THE DRAWINGS

In order that the manner in which the above-recited and other features and advantages of the present invention are obtained will be readily understood, a more particular description of the present invention briefly described above will be rendered by reference to specific embodiments thereof that are illustrated in the appended drawings. Understanding that these drawings depict only typical embodiments of the present invention and are not therefore to be considered to be limiting of scope thereof, the present invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It should be understood that the components of the present invention, as generally described and illustrated in the figures herein, can be arranged and designed in a wide variety of different configurations, and similarly that the procedures of the present invention can be ordered and performed in diverse manners. Thus, the following more detailed description of the embodiments of the present invention, as represented in FIGS. 1A-7, is not intended to limit the scope of the present invention, as claimed, but is merely representative of presently preferred embodiments of the present invention.

In this application, the phrases "connected to", "coupled to", and "in communication with" refer to any form of interaction between two or more entities, including mechanical, electrical, magnetic, electromagnetic, pneumatic, and thermal interactions.

The phrases "attached to", "secured to", "mounted to", "assembled to", and "joined to" refer to a form of mechanical coupling that restricts relative translation or rotation between the attached, secured, mounted, assembled, or joined objects, respectively. The phrases "pivotally attached to" and "slidably attached to" refer to forms of mechanical coupling that permit relative rotation or relative translation, respectively, while restricting other relative motions. The phrase "attached directly to" refers to a form of securement in which the secured items are in direct contact and retained in that state of securement without resort to fasteners or adhesives.

The term "abutting" refers to items that are in direct physical contact with each other, although the items may not be attached together. The term "grip" refers to items that are in direct physical contact with one of the items firmly holding the other. The term "integrally formed" refers to a body that is manufactured as a single piece, without requiring the assembly of constituent elements. Multiple elements may be integrally formed with each other, when attached directly to each other from a single work piece. Thus, elements that are "coupled to" each other may be formed together as a single piece.

Figure 1A:
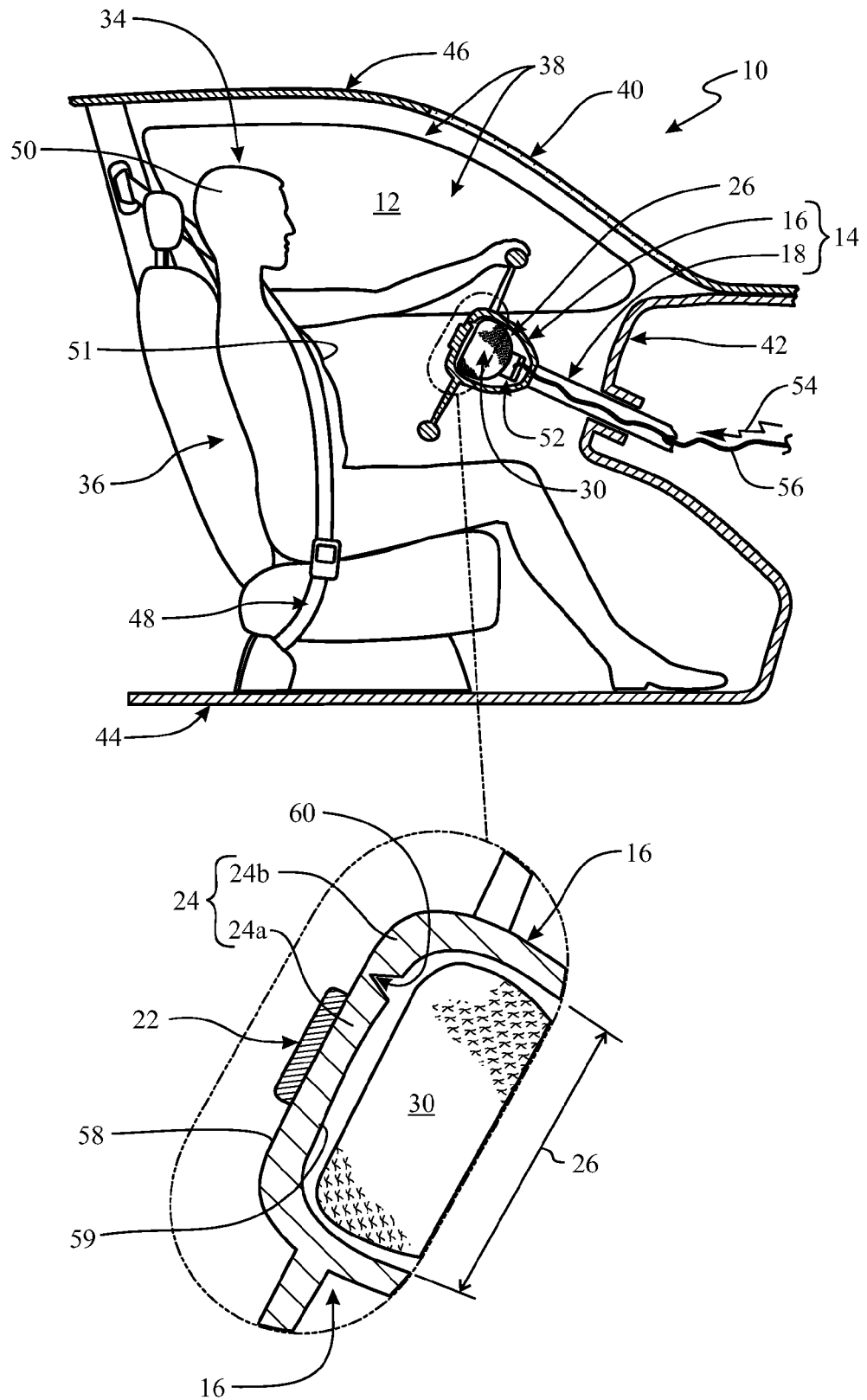
FIG. 1A is a side elevation view in partial cross section of the occupant enclosure of a highway vehicle and a first embodiment of an assembly incorporating teachings of the present invention for an emblem onto the cover for an airbag storage compartment (also shown in an enlarged cut-out) that is located in the vehicle steering wheel.

FIG. 1A is a side elevation view in partial cross section of a highway vehicle 10 that includes in an occupant enclosure 12 a steering wheel 14 having a hub 16 attached to a shaft 18. Also shown is a first embodiment of an assembly incorporating teachings of the present invention for attaching an emblem 22 onto a cover 24 for an airbag storage compartment 26 that is located in hub 16 of steering wheel 14. Airbag storage compartment 26 houses a deflated airbag 30 that is ready as needed to provide protection to a vehicle driver 34 seated within occupant enclosure 12. It should be understood, however, that the teachings of the present invention have applicability, not only to driver-side frontal impact protection, but also to other forms of passenger protection, such as passenger-side frontal impact protection, knee bolsters, overhead airbags, inflatable curtains, side airbags, inflatable structural stiffeners, and the like. Furthermore, the teachings of the present invention may be employed advantageously, not only in highway vehicles, but also in vehicles that travel over rails, from cables, on water, and through air or space.

As illustrated, vehicle 10 has a seat 36 on which driver 34 reposes, a door 38 beside driver 34, a windshield 40, a dashboard 42 in front of driver 34, a floor 44 below driver 34, and a ceiling 46 thereabove. Each of door 38, dashboard 42, floor 44, ceiling 46, and even windshield 40 carry surfaces that define occupant enclosure 12. A seat belt 48 affords the primary restraint for driver 34 in case of a collision involving vehicle 10, but a plurality of airbags are stored in deflated conditions about occupant enclosure 12 to protect a rider, such as driver 34, from impacting the surfaces of occupant enclosure 12. Airbag 30 is provided specifically to protect the head 50 and the chest 51 of driver 34 from impacting steering wheel 14 during such a collision.

Housed within airbag storage compartment 26 along with airbag 30 is an inflator 52 that generates and delivers pressurized gas to airbag 30, when an impact is imminent between driver 34 and steering wheel 14. The activation of inflator 52 is typically triggered electrically by an activation signal 54 that is received along an electrical conductor 56. Activation signal 54 is generated by a collision sensor not shown, which may, take the form of an accelerometer installed at convenient locations within vehicle 10. When a collision by vehicle 10 is occurring or is about to occur, the collision sensor generates activation signal 54, which is transmitted along electrical conductor 56 to inflator 52.

Cover 24 is interposed between airbag storage compartment 26 and occupant enclosure 12 to protect from inadvertent damage to airbag 30 and to obscure airbag 30 from the view of driver 34. As shown in the enlarged inset included in FIG. 1A, cover 24 has a front face 58 directed toward occupant enclosure 12 and a rear face 59 directed oppositely therefrom toward airbag storage compartment 26. Cover 24 is designed to open only when airbag 30 is being deployed. Toward that end, the width of rear face 59 of cover 24 is scored by a release grove 60 that allows cover 24 to split apart during the deployment of airbag 30, affording access for airbag 30 into occupant enclosure 12. In so doing, cover 24 separates into a substantial lower segment 24a and a smaller upper segment 24b. Below release grove 60, on lower segment 24a an emblem 22 is attached onto front face 58 of cover 24 using an assembly of structures that, by incorporating teachings of the present invention, preclude emblem 22 or any of those structures from becoming free-flying projectiles during the deployment of airbag 30.

Figure 1B:
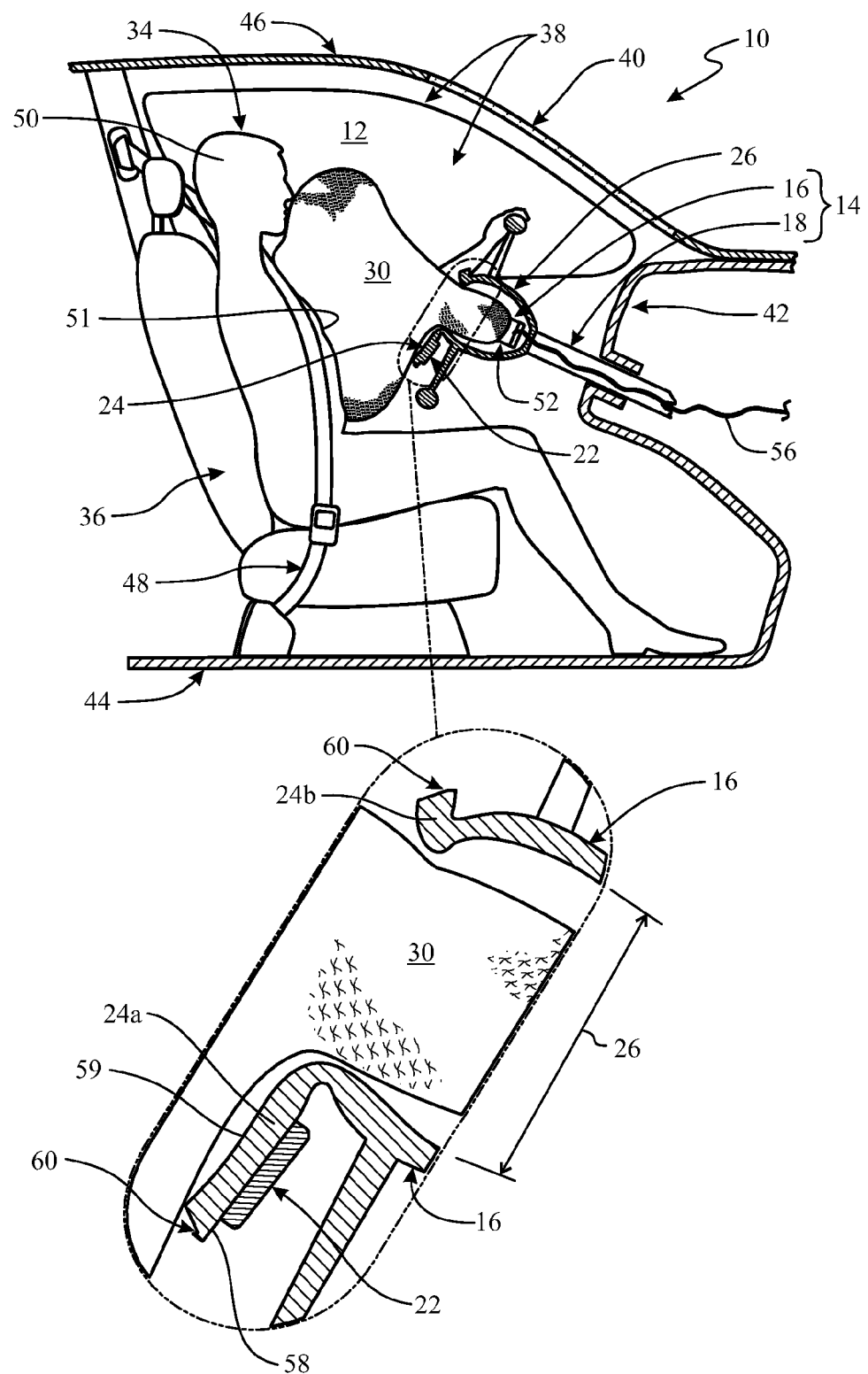
FIG. 1B depicts the same subject matter (including the enlarged cut-out) as that shown in FIG. 1A with an airbag from the airbag storage compartment of FIG. 1A deployed in an inflated condition into the occupant enclosure.

FIG. 1B depicts the consequence of a collision involving vehicle 10. Inflator 52 has been triggered, and consequently airbag 30 has been made to inflate into the deployed state thereof, extending from airbag storage compartment 26 into occupant enclosure 12 and against head 50 and chest 51 of driver 34.

In becoming thusly deployed, airbag 30 is initially driven at a high speed by the pressurized gas from inflator 52 forcefully against back face 59 of cover 24. As shown in the enlarged inset included in FIG. 1B, the consequent impact splits cover 24 along release grove 60. Lower segment 24a separates from upper segment 24b, which becomes bent slightly upwardly. Lower segment 24a, by contrast being much larger than upper segment 24b, whips downwardly into the interior of occupant enclosure 12 bearing emblem 22 on front face 58 of cover 24.

Emblem 22 and the components of the assembly by which emblem 22 is attached onto cover 24 are subjected as a result to concussions, accelerations, and decelerations of sufficient intensity to impair the structural integrity thereof. During airbag deployments, fracturing has been observed in emblems, such as emblem 22, and in the components with which the emblem is attached to an airbag storage compartment cover. Lower segment 24a and upper segment 24b of cover 24 remain hinged to hub 16 of steering wheel 14 during the deployment of airbag 30, but fractures in an emblem, such as emblem 22, or in the components of the assembly used to attach the emblem to an airbag storage compartment cover, have been known to cause fragments that may detach entirely from the cover. Detached fragments of this type have the potential to become dangerous projectiles that, by traveling at high speed about occupant enclosure 12, place passengers, such as driver 34, in grave risk of severe injury.

It is toward the prevention of such dire consequences that the teachings of the present invention are incorporated into an assembly of structures by which emblem 22 can with full safety be attached onto cover 24. While these structures do not explicitly appear in FIGS. 1A and 1B, the structures will be presented in full detail subsequently, following an orientation conducted relative to FIG. 2.

Figure 2:
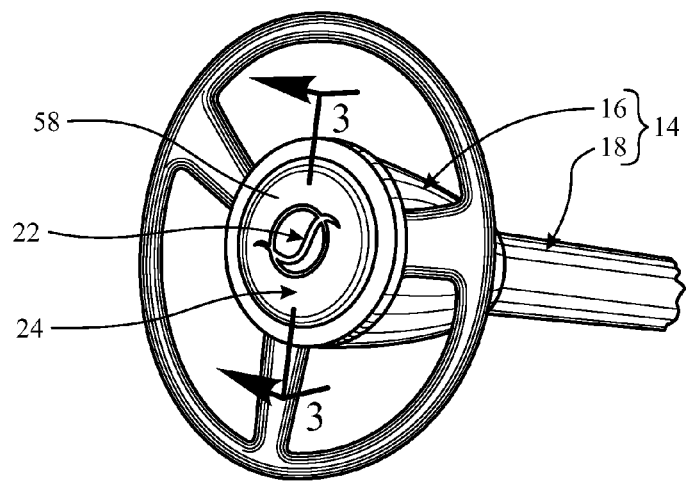
FIG. 2 is a perspective view of an exemplary steering wheel of FIG. 1A showing the cover for the airbag storage enclosure therein and the emblem assembled thereto.

FIG. 2 is a perspective view of steering wheel 14 as seen from within occupant enclosure 12 of FIG. 1A. Cover 24 obscures from view an airbag storage enclosure 26 inside hub 16 of steering wheel 14. A deflated passenger safety airbag 30 is housed in that airbag storage enclosure 26, ready for deployment as circumstances demand. Emblem 22 is attached onto front face 58 of cover 24 by methods and structures that incorporate teachings of the present invention. Those teachings are best understood by reference to an assembly of those structures presented in the cross-sectional view of emblem 22 and cover 24 in FIG. 3.

Figure 3:
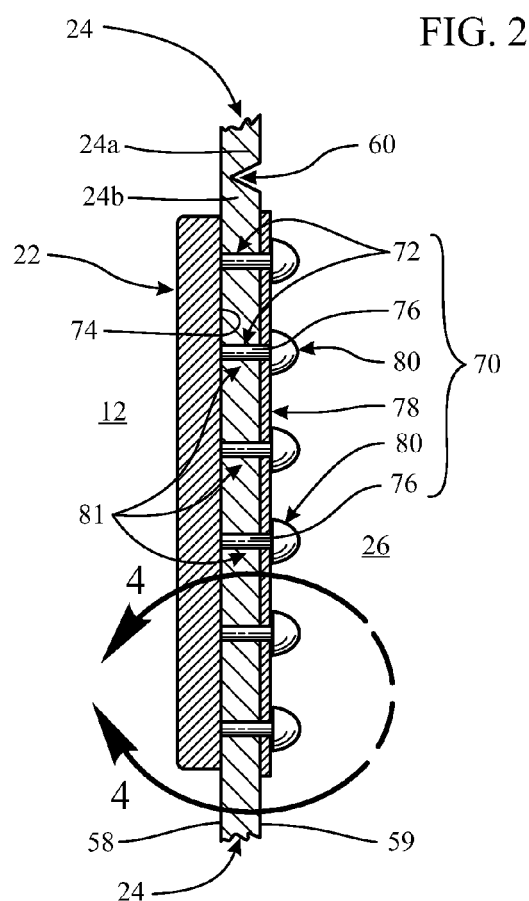
FIG. 3 is a view in partial cross section of the emblem and the airbag storage enclosure cover of FIG. 2 taken along section line 3-3 to reveal a plurality of attachment sites for the emblem onto the cover.

FIG. 3 thus depicts an assembly 70 by which emblem 22 is attached onto front face 58 of cover 24 for airbag storage enclosure 26. Assembly 70 includes a plurality of attachment posts 72 that project from the back surface 74 of emblem 22. Each attachment post 72 extends through cover 24 from front face 58 thereof, and each attachment post 72 terminates in a respective free end 76 that is remote from back surface 74 of emblem 22. An attachment backing sheet 78 is positioned against rear face 59 of cover 24. Accordingly, each of attachment posts 72 extends through attachment backing sheet 78 with the respective free end 76 thereof positioned on the side of attachment backing sheet 78 opposite from cover 24. Lastly, assembly 70 includes a plurality of radially-enlarged attachment nuggets 80 that are joined individually in one-to-one association to free ends 76 of each of the plurality of attachment posts 72. Each attachment nugget 80 is also secured to attachment backing sheet 78 in proximity to the individual attachment post 72 associated with that respective attachment nugget 80. Each combination of an attachment post 72 and an associated attachment nugget 80 forms one of a plurality of attachment sites 81 at which emblem 22 is secured to cover 24 by assembly 70.

The interrelationship of the components of assembly 70 with cover 24 at each attachment site 81 provides advantageous safety for passengers in occupant enclosure 12 during any deployment of airbag 30.

For example, an attachment post 72 may fracture transversely at an intermediate location along the length thereof, when lower segment 24a of cover 24 is being thrust aside into occupant enclosure 12. The end of the fractured attachment post 72 that is adjacent to back surface 74 of emblem 22 will remain attached to emblem 22. Emblem 22 and any elements of assembly 70 that continues to be attached thereto will be retained on cover 24 by the unbroken remainder of the plurality of attachment sites 81 that attach emblem 22 to cover 24. The end of the fractured attachment post 72 that is adjacent to free end 76 thereof is joined to an associated attachment nugget 80, and that attachment nugget 80 is secured to attachment backing sheet 78. Attachment backing sheet 78 and all elements of assembly 70 that that continue to be attached thereto will be retained on cover 24 by the unbroken remainder of the plurality of attachment sites 81 that attach emblem 22 to cover 24. Thus, despite the fracture of an attachment post 72, no portion of emblem 22 or of assembly 70 is loosed from cover 24 to become a dangerous projectile in occupant enclosure 12.

If an attachment post 72 becomes broken from emblem 22 at back surface 74 thereof, that attachment post 72 will be prevented from becoming detached from cover 24 by the attachment nugget 80 associated therewith, which is secured to attachment backing sheet 78. Similarly, if an attachment nugget 80 becomes broken from free end 76 of an associated attachment post 72, that attachment nugget 80 will, nonetheless, be prevented from becoming detached from cover 24, because the attachment nugget 80 is secured to attachment backing sheet 78.

Thus, it can be appreciated that an attachment backing sheet, such as attachment backing sheet 78, functions as means for tethering each of the plurality of attachment nuggets 80 to cover 24 in the event of, either the detachment of one of the attachment nuggets 80 from an associated attachment post 72, or the fracture of all or a portion of one of attachment posts 72 from emblem 22.

In assembly 70, attachment backing sheet 78 is made from a thin, porous material, such as a material chosen from the group of materials that includes a woven or nonwoven fabric, a mesh, and a screen. The fabric from an airbag, such as airbag 30 will function well as attachment backing sheet 78. Attachment nuggets 80 are made from a thermoplastic material. The material of each attachment nugget 80 is induced to permeate the pores in the material of attachment backing sheet 80, doing so in proximity to the attachment post 72 associated therewith. Thus, as seen in the enlargement of assembly 70 presented in FIG. 4, the portion of attachment backing sheet 78 adjacent to each attachment post 72 is permeated by material from the attachment nugget 80 associated therewith, forming a securement region 82 that is composite of the material of attachment backing sheet 78 and the material of attachment nugget 80. While what might appear to be a pair of securement regions 82 are seen in the edge view presented in FIG. 4, in three-dimensional perspective each securement region 82 forms an annulus that encircles each associated attachment post 72 beneath and about each associated attachment nugget 80. The material continuity established in this manner between attachment nuggets 80 and the pores of attachment backing sheet 78 in each securement region 82 results in the formation of a mechanically reliable bond between each attachment nugget 80 and attachment backing sheet 78.

Figure 4:
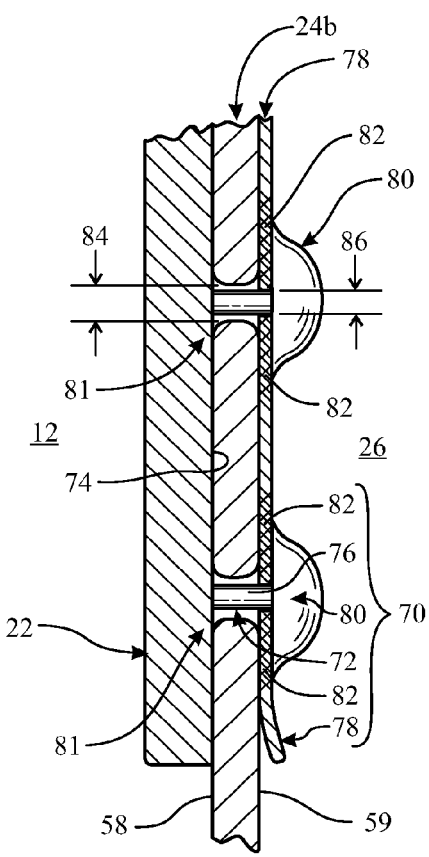
FIG. 4 is an enlarged detail view of the attachment sites in FIG. 3 enclosed by detail arrow 4-4.

Alternative configurations of an assembly incorporating teachings of the present invention are possible, but in passing from FIG. 4 to a discussion of the methods by which an assembly, such as assembly 70, may be manufactured, it should be noted that attachment posts 72 pass through cover 24 by way of a plurality of apertures 84 that are formed through cover 24 corresponding in number and pattern to the number and the pattern of the plurality of attachment posts 72 projecting from back surface 74 of emblem 22. Likewise, attachment posts 72 pierce attachment backing sheet 78 by way of a plurality of slits 86 through attachment backing sheet 78 that correspond in number and pattern to the number and the pattern of the plurality of attachment posts 72 projecting from back surface 74 of emblem 22. Slits 86 facilitate the joinder of attachment nuggets 80 to securement regions 82 by engaging the shafts of attachment posts 72 beneath each associated attachment nugget 80, thereby to better wick the material of each attachment nugget 80 into the pores in attachment backing sheet 78.

Figure 5A:
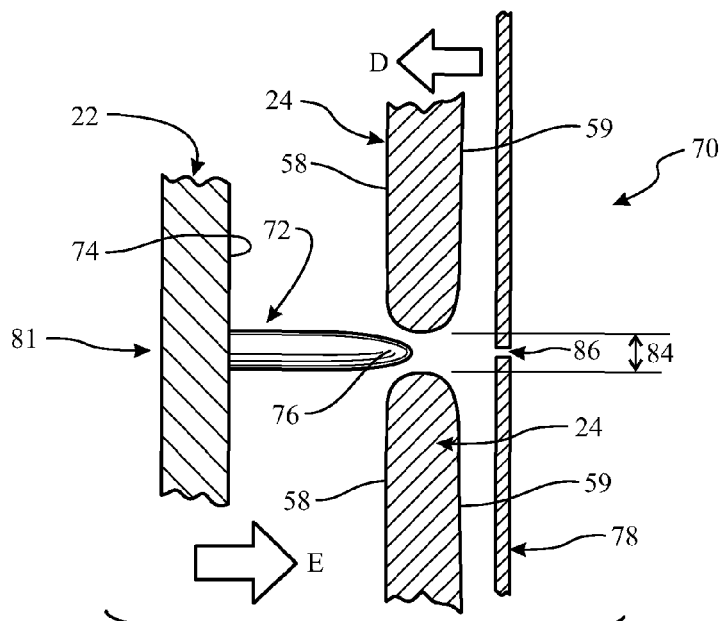
FIGS. 5A-5C form a series of illustrations in partial cross section that depicts stages in the interaction of the structures at the attachment site of FIG. 4 to secure the emblem to the airbag storage enclosure cover, namely with FIG. 5A illustrating those structures in a disassembled condition, FIG. 5B illustrating those structures in an initial stage of assembly, and with FIG. 5C illustrating those structures in a fully assembled condition.
Figure 5B:
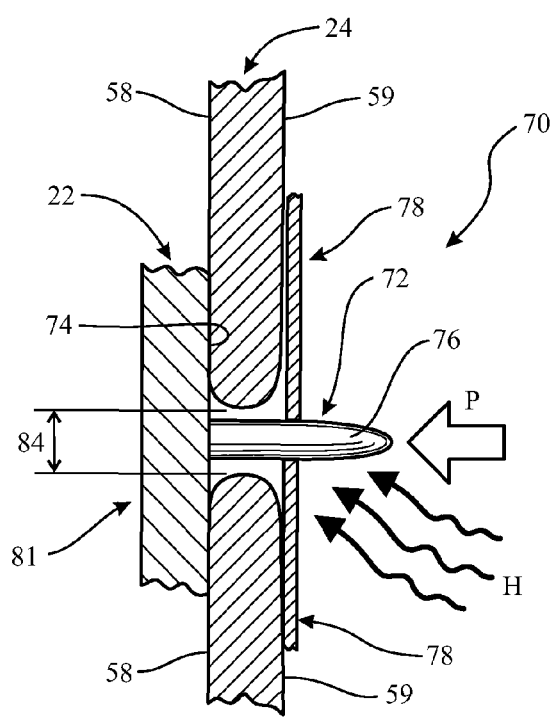
Figure 5C:
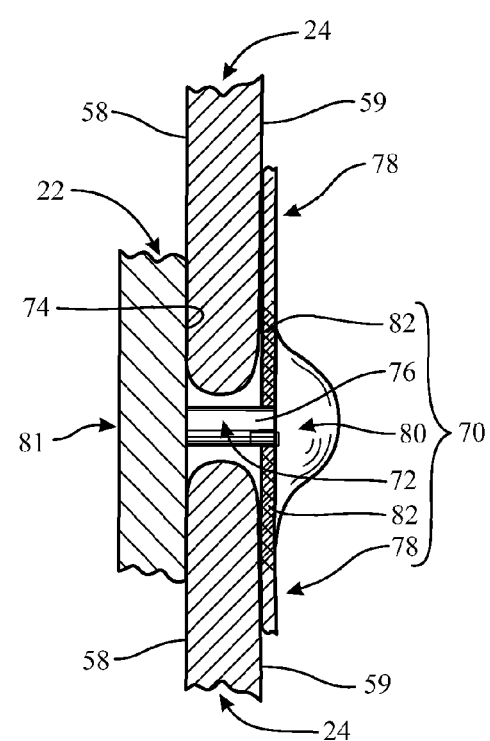

FIGS. 5A-5C form a series of illustrations in partial cross section that depicts stages in the manufacture of an attachment site 81 of assembly 70 in FIG. 4.

FIG. 5A illustrates those structures in a disassembled condition. Attachment backing sheet 78 with a slit 86 formed therethrough is disposed generally parallel to rear face 59 of cover 24. Slits 86 is aligned generally with an aperture 84 formed through cover 24. Emblem 22 is disposed generally parallel to cover 24 with back surface 74 of emblem 22 directed toward front face 58 of cover 24. Attachment post 72 projects from back surface 74 of emblem 22 with free end 76 thereof entering aperture 84 from front face 58 of cover 24. As suggested by arrow D, attachment backing sheet 78 is moved toward rear face 59 of cover 24 to become disposed there against. Simultaneously, subsequently, or even earlier, emblem 22 is moved toward cover 24, advancing free end 76 of attachment post 72 through aperture 84. This is indicated by arrow E in FIG. 5A. If attachment backing sheet 78 is at the time already disposed against rear face 59 of cover 24, free end 76 of attachment post 72 simultaneously pierces attachment backing sheet 78 through slit 86.

Cover 24 becomes sandwiched between emblem 22 and attachment backing sheet 78 as shown in FIG. 5B. Back surface 74 of emblem 22 abuts front face 58 of cover 24, while attachment backing sheet 78 rests against rear face 59 of cover 24. Free end 76 of attachment post 72 is presented on the side of attachment backing sheet 78 opposite from cover 24. To effect the completion of attachment site 81, free end 76 of attachment post 72 is subjected to a treatment calculated to soften the material of free end 76. Typically this involves the application of heat H to free end 76 using, by way of example but not limitation, a treatment selected from the group of treatments comprising ultrasonic heating, conduction heating, and convection heating. Simultaneously or thereafter, a pressure P is applied to the softened material of free end 76 in alignment with the longitudinal extent of attachment post 72. This deforms the softened material of free end 76 radially outwardly as well as toward attachment backing sheet 78, ultimately urging the softened material of free end 76 into pores in attachment backing sheet 78. The free end 76 is transformed into attachment nugget 80 by rendering it into a liquid state by heat H. Pressure P may or may not be required to make material from free end 76 of attachment post 72 permeates the pores in attachment backing sheet 78 establishing the securement region 82. Such can be expected where heat H is applied to free end 76 of attachment post 72 using ultrasonic heating.

In any case, however, the softened material of free end 76 ultimately becomes attachment nugget 80. Advantageously relative to manufacturing simplicity, attachment nuggets 80 are thereby integrally formed from and with free ends 76 of attachment posts 72.

A finished attachment site 81 of the type shown in FIG. 5C for assembly 70 results advantageously incorporating teachings of the present invention and possessed of the vehicular passenger safety features discussed above in relation to FIG. 3.

FIGS. 6A-6D form a series of illustrations in partial cross section that depicts stages in the interaction of structures that form either of two types of attachment sites in an embodiment of a second assembly 90 that also incorporates teachings of the present invention.

Figure 6A:
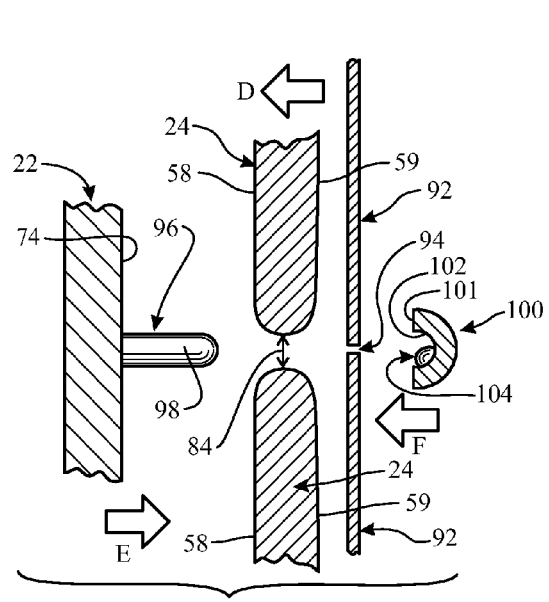
FIGS. 6A-6D form a series of illustrations in partial cross section that depicts stages in the interaction of structures at attachment site in a second embodiment of an assembly according to the present invention to secure an emblem to the cover for an airbag storage enclosure, namely with FIG. 6A illustrating those structures in a disassembled condition, with FIG. 6B illustrating those structures in a first final state of assembly, with FIG. 6C illustrating the structures of FIG. 6B undergoing further processing, and with FIG. 6D illustrating the structures of FIG. 6C in a second final state of assembly.

FIG. 6A illustrates the structures of an attachment site of second assembly 90 in a disassembled condition. An attachment backing sheet 92 with a slit 94 formed therethrough is disposed generally parallel to rear face 59 of cover 24. Slit 94 is aligned generally with aperture 84 formed through cover 24. Emblem 22 is disposed generally parallel to cover 24 with back surface 74 of emblem 22 directed toward front face 58 of cover 24. An attachment post 96 projects from back surface 74 of emblem 22 with the free end 98 thereof about to enter aperture 84 from front face 58 of cover 24. As suggested by arrow D, attachment backing sheet 92 is moved toward rear face 59 of cover 24 to become disposed there against. Simultaneously, subsequently, or even earlier, emblem 22 is moved toward cover 24, advancing free end 98 of attachment post 96 through aperture 84. This is indicated by arrow E in FIG. 6A. If attachment backing sheet 92 is at the time already disposed against rear face 59 of cover 24, free end 98 of attachment post 96 simultaneously pierces attachment backing sheet 92 through slit 94. Cover 24 becomes sandwiched between emblem 22 and attachment backing sheet 92.

Assembly 90 also includes an attachment cap 100 that is distinct from attachment post 96, but that is intended to be bonded to free end 98 thereof. Attachment cap 100 is shown, by way of example only, as being a semispherical structure with a planar diametrically-disposed backing sheet engagement face 101. Attachment cap 100 encloses a cavity 102 that opens to the exterior of attachment cap 100 centrally of backing sheet engagement face 101. In cavity 102 is carried a quantity of adhesive 104. As suggested by arrow F, following the steps of manufacture described immediately above, free end 98 of attachment post 96 is received in cavity 102 of attachment cap 100, and adhesive 104 bonds attachment cap 100 to attachment post 96.

Once thusly-bonded to attachment post 96, attachment cap 100 is able to function thereafter substantially like an attachment nugget that is integrally formed on the free end of an attachment post from the material of that attachment post in the manner illustrated earlier in FIGS. 5A-5C. Accordingly, as used herein the expression "attachment nugget" includes any radially extending structure on the free end of an attachment post for mounting an emblem onto the cover for an airbag storage enclosure, whether that structure is formed from the attachment post itself, as in FIGS. 5a-5C, or that structure arises from the joinder to the attachment post of one or more components initially distinct from the attachment post itself, as in FIGS. 6A-6D.

It remains to secure the attachment nugget represented by attachment cap 100 to attachment backing sheet 92 in proximity to each associated attachment post 96.

Figure 6B:
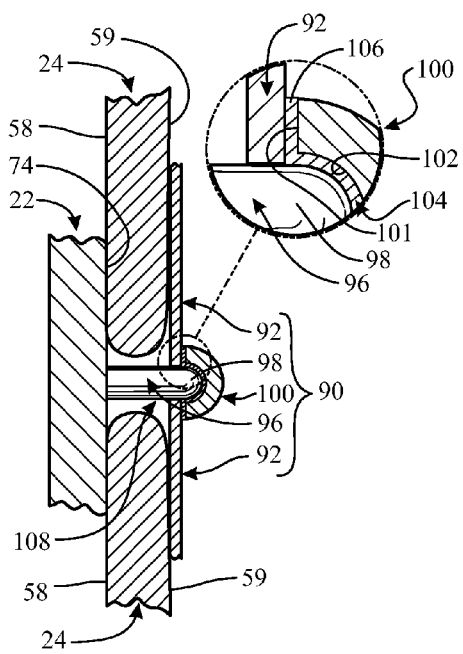

In FIG. 6B, a first type of attachment site for second assembly 90 is formed, when attachment backing sheet 92 is made of a bondable plastic material. Then, a large quantity of adhesive 104 carried in cavity 102 will suffice, not only to bond attachment cap 100 to attachment post 96, but also to secure attachment cap 100 to attachment backing sheet 92. When free end 98 of attachment post 96 is received in cavity 102, the portion of adhesive 104 not consumed in bonding attachment cap 100 to attachment post 96 flows out of cavity 102 and into an annular bonding interface region 106 shown in the enlarged inset in FIG. 6B between attachment backing sheet 92 and backing sheet engagement face 101 of attachment cap 100. Attachment cap 100 on free end 76 of attachment post 72 thereby becomes bonded also to attachment backing sheet 92. A completed first attachment site 108 results of the type shown in FIG. 6B for second assembly 90, advantageously incorporating teachings of the present invention and possessed of the vehicular passenger safety features discussed earlier.

Figure 6C:
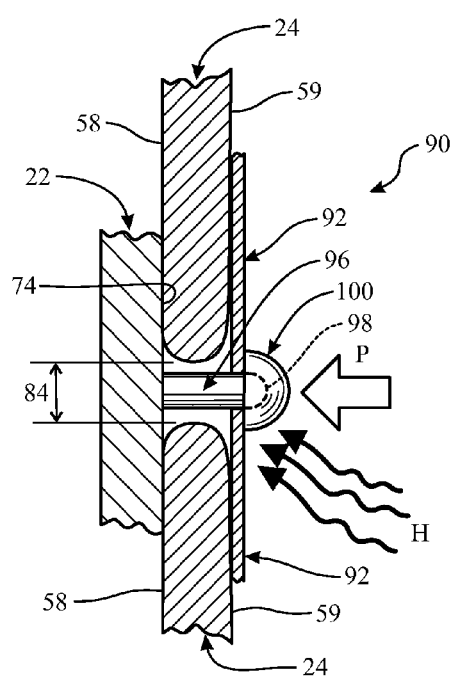
Figure 6D:
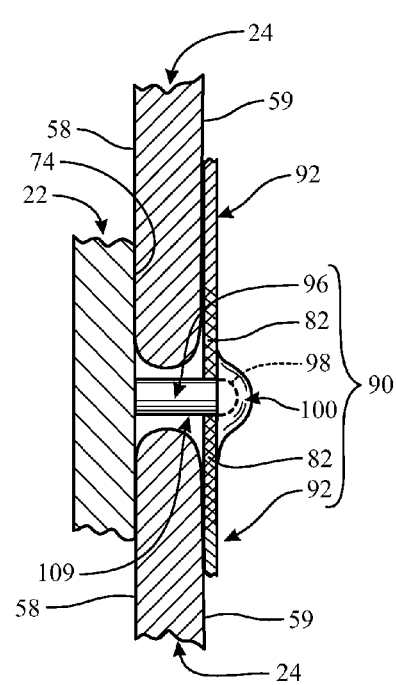

FIGS. 6C and 6D depict steps in the formation of a second type of attachment site for second assembly 90. To form this second type of attachment site, backing sheet 92 is made from a porous material, and attachment cap 100 is made of a thermoplastic material. Initially, attachment cap 100 is bonded to free end 98 of attachment post 96 in the manner illustrated in FIGS. 6A and 6B, but using only sufficient adhesive in cavity 102 of attachment cap 100 to accomplish that objective solely. In that case, backing sheet engagement face 101 of attachment cap 100 is not bonded to attachment backing sheet 92 by any of the adhesive 104 initially carried in cavity 102 in attachment cap 100. Instead, as shown in FIG. 6C, heat H is applied to attachment cap 100 to soften the material of attachment cap 100. Simultaneously or thereafter, pressure P is applied to the softened material of attachment cap 100, urging the softened material of attachment cap 100 into the pores of attachment backing sheet 92 in securement regions 82. Where heat H renders attachment cap 100 into a liquid state, pressure P may not be required to make material from attachment cap 100 fill the pores in attachment backing sheet 92. Such can be expected where heat H is applied to attachment cap 100 using ultrasonic heating. A completed second attachment site 109 results of the type shown in FIG. 6D for second assembly 90, advantageously incorporating teachings of the present invention and possessed of the vehicular passenger safety features discussed earlier.

Of course, the alternative use of attachment cap 100 could also be formed into a suitable securement region 82 without the use of any adhesive 104 by holding the attachment cap 100 next to free end 98 during heating so that they are fused together and some of the attachment cap 100 permeates the backing sheet 92. Those skilled in the art will understand other variations for creating acceptable securement regions using an attachment cap 100.

The present invention also contemplates methods for attaching an emblem, such as emblem 22, onto the front face of the cover for an airbag storage enclosure. One embodiment of such a method 110 will be explored by reference to the flowchart presented in FIG. 7.

Beginning at a commencement oval 112, method 110 involves the step indicated in instruction rectangle 114 of disposing an attachment backing sheet, such as attachment backing sheet 78 or attachment backing sheet 92, against the rear face of the cover for an airbag storage enclosure, and the step indicated in instruction rectangle 116 of causing a plurality of attachment posts, such as attachment posts 72 or attachment posts 96, to project from the back surface of the emblem. Each of the attachment posts terminates in a free end that is remote from the emblem. A pair of subroutines then ensues. As indicated in subroutine enclosure 118, the free ends of the plurality of attachment posts are advanced through the cover from the front face thereof, and as indicated in subroutine enclosure 120, the free ends of the plurality of attachment posts are also made to pierce through the attachment backing sheet. Method 110 then involves a pair of additional steps. As indicated in subroutine enclosure 122, a plurality of radially-enlarged attachment nuggets are joined individually in a one-to-one association to the free ends of each of the plurality of attachment posts, and as indicated in subroutine enclosure 124, the plurality of attachment nuggets are secured to the attachment backing sheet in the vicinity of the respective attachment post associated with each. Method 110 concludes at termination oval 126.

Figure 7:
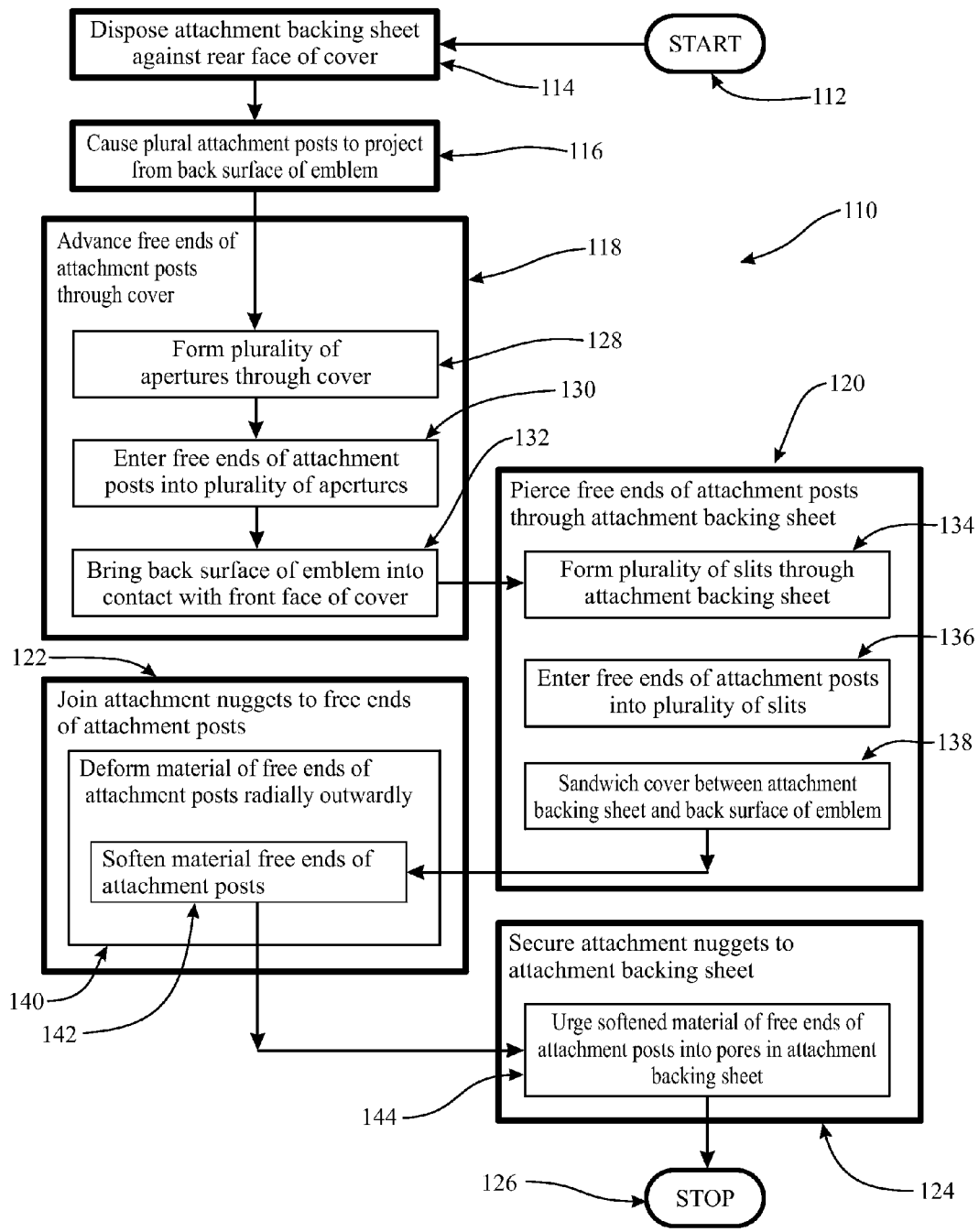
FIG. 7 is a flow chart of an embodiment of a method incorporating teachings of the present invention for assembling an emblem onto the cover for an airbag storage enclosure.

The order in which the procedures of method 110 are undertaken may be varied from the order shown in FIG. 7. Selected of those procedures may be conducted simultaneously.

For example, the disposal of the attachment backing sheet called for in instruction rectangle 114 may be undertaken after the advancement of the free ends of the attachment posts through the airbag storage enclosure cover called for in subroutine enclosure 118. Alternatively, the advancement of the free ends of the attachment posts through the airbag storage enclosure cover called for in subroutine enclosure 118 and the piercing of the free ends of the attachment posts through the attachment backing sheet called for in subroutine enclosure 120 may be performed simultaneously. In some embodiments of a method, such as method 110, this would also be the case for the joinder of the attachment nuggets and the securement of the attachment nuggets to the attachment backing sheet called for, respectively. in subroutine enclosure 122 and in subroutine enclosure 124.

Several of the procedures of method 110 shown in FIG. 7 may be performed in a variety of different ways.

For example, in one embodiment of a method, such as method 110, the advancement of the free ends of the attachment posts through the cover called for in subroutine enclosure 118 involves forming a plurality of apertures through the cover corresponding in number and pattern to the number and the pattern of the plurality of attachment posts on the back surface of the emblem as in instruction rectangle 128, entering the free ends of the plurality of attachment posts from the front face of the cover individually in one-to-one association into the plurality of apertures through the cover as in instruction rectangle 130, and bringing the backsurface of the emblem into contact with the front face of the cover as in instruction rectangle 132.

In another embodiment of a method, such as method 110, the piercing of the free ends of the attachment posts through the attachment backing sheet called for in subroutine enclosure 120 involves forming a plurality of slits through the attachment backing sheet corresponding in number and pattern to the number and the pattern of the plurality of attachment posts on the back surface of the emblem as in instruction rectangle 134, entering the free ends of the plurality of attachment posts from the side of the attachment backing sheet facing the cover individually in one-to-one association into of the plurality of the slits through the attachment backing sheet as in instruction rectangle 136, and sandwiching the cover between the attachment backing sheet and the back surface of the emblem as in instruction rectangle 138.

The joinder of attachment nuggets to the free ends of the attachment posts called for in subroutine enclosure 122 may entail deforming the material of the free end of each of the plurality of attachment posts radially outwardly of each of the plurality of attachment posts as indicated in sub-subroutine enclosure 140. The deforming process may in turn involve the step shown in instruction rectangle 142 of softening the material of the free end of each of the plurality of attachment posts using a treatment selected from the group of treatments comprising ultrasonic heating, conduction heating, and convection heating.

The securement of the attachment nuggets to the attachment backing sheet called for in subroutine enclosure 124 may, for example, involve the step of urging the softened material of each of the plurality of attachment nuggets into pores in the attachment backing sheet as shown in FIG. 7 in instruction rectangle 144. On the other hand, alternate procedures have been discussed above by which attachment nuggets arising from structures distinct from but joined to attachment posts can be secured to the attachment backing sheet.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An assembly for attaching an emblem onto the front face of the cover for an airbag storage enclosure, the assembly comprising:
   (a) a plurality of attachment posts projecting from the back surface of the emblem, each of the attachment posts extending through the cover from the front face thereof and terminating in a respective free end thereof remote from the emblem;
   (b) an attachment backing sheet positioned against the rear face of the cover, each of the attachment posts extending through the attachment backing sheet with the respective free end thereof positioned on the side of the attachment backing sheet opposite from the cover, the attachment backing sheet is comprised of a porous material; and
   (c) a plurality of radially-enlarged attachment nuggets joined individually in one-to-one association to the free end of each of the plurality of attachment posts, each of the plurality of attachment nuggets being secured to the backing sheet in proximity to the attachment post thereby associated therewith such that material of each of the plurality of attachment nuggets permeates pores in the porous material of the attachment backing sheet.

2. An assembly as recited in claim 1, wherein each of the plurality of attachment nuggets is integrally formed with the free end of the attachment post associated therewith.

3. An assembly as recited in claim 1, wherein the material of the attachment backing sheet is chosen from the group of materials comprising a fabric, a mesh, and a screen.

4. An assembly as recited in claim 2, wherein each of the plurality of attachment nuggets is bonded to the attachment backing sheet in proximity to the attachment post associated therewith.

5. An assembly as recited in claim 1, wherein each of the plurality of attachment nuggets is bonded to the free end of the attachment post associated therewith.

6. An assembly as recited in claim 5, wherein each of the plurality of attachment nuggets is bonded to the attachment backing sheet in proximity to the attachment post associated therewith.

7. An assembly as recited in claim 5, wherein:
   (a) the attachment backing sheet is comprised of a porous material; and
   (b) the material of each of the plurality of attachment nuggets permeates pores in the material of the attachment backing sheet in proximity to the attachment post associated therewith.

8. A system for attaching an emblem onto the front face of the cover for an airbag storage enclosure, the system comprising:
   (a) an attachment backing sheet positioned against the rear face of the cover, the attachment backing sheet is comprised of a porous material; and
   (b) a plurality of attachment posts projecting from the back surface of the emblem, each of the attachment posts being extendable through the cover from the front face thereof and through the attachment backing sheet to terminate in a respective free end thereof positioned on the side of the attachment backing sheet opposite from the cover, the free end of each of each of the plurality of attachment posts being deformable into a respective radially-enlarged attachment nugget, and each of the attachment nuggets becoming thereby secured to the attachment backing sheet in proximity to the attachment post associated therewith such that material of each of the plurality of attachment nuggets permeates pores in the porous material of the attachment backing sheet.

9. A method for attaching an emblem onto the front face of the cover for an airbag storage enclosure, the method comprising the steps of:
   (a) disposing an attachment backing sheet against the rear face of the cover;
   (b) causing a plurality of attachment posts to project from the back surface of the emblem, each of the attachment posts terminating in a free end remote from the emblem;
   (c) advancing the free ends of the plurality of attachment posts through the cover from the front face thereof;
   (d) piercing the free ends of the plurality of attachment posts through the attachment backing sheet;
   (e) joining a plurality of radially-enlarged attachment nuggets individually in a one-to-one association to the free ends of each of the plurality of attachment posts; and
   (f) securing each of the plurality of attachment nuggets to the attachment backing sheet in the vicinity of the respective attachment post associated therewith such that material of each of the plurality of attachment nuggets permeates pores in the attachment backing sheet.

10. A method as recited in claim 9, wherein the step of advancing comprises the steps of:
   (a) forming a plurality of apertures through the cover corresponding in number and pattern to the number and the pattern of the plurality of attachment posts on the back surface of the emblem;
   (b) entering the free ends of the plurality of attachment posts from the front face of the cover individually in one-to-one association into the plurality of apertures through the cover; and
   (d) bringing the back surface of the emblem into contact with the front face of the cover.

11. A method as recited in claim 9, wherein the step of piercing comprises the steps of:
   (a) forming a plurality of slits through the attachment backing sheet corresponding in number and pattern to the number and the pattern of the plurality of attachment posts on the back surface of the emblem;
   (b) entering the free ends of the plurality of attachment posts from the side of the attachment backing sheet facing the cover individually in one-to-one association into of the plurality of the slits through the attachment backing sheet; and
   (d) sandwiching the cover between the attachment backing sheet and the back surface of the emblem.

12. A method as recited in claim 9, wherein the step of joining and the step of securing are performed simultaneously.

13. A method as recited in claim 9, wherein the step of joining comprises the step of deforming the material of the free end of each of the plurality of attachment posts radially outwardly of each of the plurality of attachment posts.

14. A method as recited in claim 13, wherein the step of deforming comprises the step of softening the material of the free end of each of the plurality of attachment posts using a treatment selected from the group of treatments comprising ultrasonic heating, conduction heating, and convection heating.

15. A method as recited in claim 9, wherein the step of joining comprises the step of bonding the plurality of attachment nuggets individually in a one-to-one relationship to the free ends of the plurality of corresponding attachment posts.

* * * * *